United States Patent [19]
Holmes et al.

[11] 3,742,071
[45] June 26, 1973

[54] PROCESS FOR THE PRODUCTION OF HYDROQUINONE

[75] Inventors: Jerry D. Holmes; Hugh J. Hagemeyer, Jr., both of Longview, Tex.

[73] Assignee: Eastman Kodak Company, Rochester, N.Y.

[22] Filed: Aug. 16, 1971

[21] Appl. No.: 172,325

[52] U.S. Cl. .......................... 260/621 R, 252/431 P
[51] Int. Cl. ............................................. C07c 37/00
[58] Field of Search ............................... 260/621 R; 252/431 P

[56] References Cited
UNITED STATES PATENTS
3,674,768  7/1972  Allum et al. .................. 252/431 P X
3,487,112  12/1969  Paulik et al. ................. 252/431 P X
3,355,503  11/1967  Pino et al. .................... 260/621 R

*Primary Examiner*—Leon Zitver
*Assistant Examiner*—Norman Morgenstern
*Attorney*—Cecil D. Quillen, Jr. and Daniel B. Reece III

[57] ABSTRACT

Hydroquinone is produced by a process involving the reacting of acetylene with carbon monoxide and hydrogen in a non-reactive solvent containing a phosphine-rhodium complex catalyst having the general formula

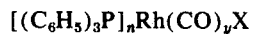
$[(C_6H_5)_3P]_n Rh(CO)_y X$ wherein
X is Cl or I;
n is 1, 2 or 3;
y is 0, 1 or 2; and
$n + y = 3$ at a temperature of from about 100°C. to 250°C. and a pressure of from about 500 to 8,000 psi.

11 Claims, No Drawings

PROCESS FOR THE PRODUCTION OF HYDROQUINONE

This invention relates to a process for the manufacture of hydroquinone and in particular relates to an improved process for the production of hydroquinone from acetylene. More specifically, this invention comprises contacting acetylene, carbon monoxide and hydrogen, with a non-reactive, liquid phase reaction medium containing a catalytic amount of a mono-, bis- or tris-triphenylphosphine ligand complexed with rhodium having the general formula $$[(C_6H_5)_3P]_nRh(CO)_yX$$

wherein
X is Cl or I;
$n$ is 1, 2 or 3;
$y$ is 0, 1 or 2; and
$n + y = 3$ and thereafter removing the hydroquinone formed.

Hydroquinone has found wide acceptance in the chemical industry as a useful intermediate in such areas as photographic reducers, developers, polymerization inhibitors, antioxidants and as a reagent in the determination of small quantities of phosphate, to name but a few. In view of the large quantity of hydroquinone used in these and other fields, the industry has devoted considerable time and expense to developing processes whereby hydroquinone may be produced in large quantities at the lowest possible cost. One of the preferred commercial processes now in use in the industry for producing hydroquinone involved the reduction of quinone, obtained by oxidation of aniline, which in turn is prepared from benzene either by nitration and reduction or by chlorination followed by amination. In view of the fact that this method involves six separate and distinct operations, starting from the parent aromatic hydrocarbon, an improved process whereby hydroquinone can be produced using fewer operations and at a reduction in overall cost has long been sought by the industry.

In an attempt to satisfy the need for a simple and inexpensive process for producing hydroquinone, it has been proposed that acetylene be reacted with carbon monoxide in the presence of reactive hydroxyl-group containing compounds using an iron, cobalt, rhodium, or ruthenium catalyst, which may be in the form of a halide, carbonyl or chelate. This general type of reaction in which water is the reactive hydroxyl-group containing compound may be represented as follows:

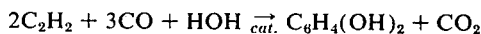

Other compounds such as alcohol which contain a reactive hydroxyl group can be used in place of water in the manner taught by U. S. Pat. No. 3,420,895.

From a commercial standpoint, these processes which use a reactive hydroxyl group also leave much to be desired. Since hydrogen for the reaction must be formed at the expense of carbon monoxide and hydroxyl-group containing compound, carbon dioxide is produced as a by-product. Thus, some use for the carbon dioxide by-product must be available or the cost of the process may become excessively high. In addition to requiring the handling and storage of large quantities of the hydroxyl-group containing compound and the loss of carbon monoxide, these reactions usually require very high pressures, high catalyst concentrations, and long reaction times. It has also been found that the yield normally obtainable with these processes is less than 35 percent (see U. S. Pat. No. 3,055,949) which is well below what might be considered commercially acceptable.

Thus, it can be seen that the ideal process for producing hydroquinone from acetylene would involve the use of carbon monoxide and hydrogen in the absence of any reactive hydroxyl-group containing compound and may be represented as follows:

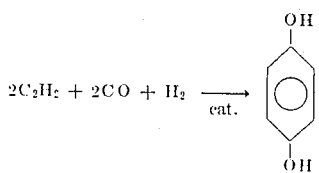

Such a reaction would of necessity involve the use of a catalyst to direct the reaction since the reactants will not normally combine to form hydroquinone. Although it might first appear that a number of prior known catalysts could be used and that little difficulty would be encountered in developing a commercial hydroquinone process involving an acetylene-carbon monoxide-hydrogen reaction, the amount of time and expense plus the fact that such a process has not heretofore been developed clearly illustrates that such has not been found to be true. Only a small number of catalysts have been developed which will produce such a reaction even on a limited yield basis, and only a very few of these catalysts are reactive enough to be of any commercial interest. One of the best of these prior known catalysts for the acetylene-carbon monoxide-hydrogen reaction is trimeric ruthenium carbonyl. However, under near optimum conditions this catalyst has produced a yield of less than 34 percent calculated on reacted acetylene (see U. S. Pat. No. 3,355,503). As will be appreciated, this yield is substantially less than would be desirable if this process is to be used on a commercial scale.

Therefore, it is an object of this invention to provide a process in which acetylene, carbon monoxide and hydrogen are reacted together to produce hydroquinone in high yields.

Another object of this invention is to provide a one-step process for producing hydroquinone in which acetylene, carbon monoxide and hydrogen are reacted together in the absence of a reactive solvent.

A still further object of this invention is to provide a process for producing hydroquinone which does not produce any by-products.

These and other objects and advantages of this invention will become apparent from the following description and appended claims.

In accordance with this invention, it has been found that hydroquinone can be produced by a one-step process in high yields by reacting acetylene with carbon monoxide and hydrogen in a non-reactive solvent using as a catalyst phosphine-halide complexes of rhodium having the following formula:

$$[(C_6H_5)_3P]_nRh(CO)_yX$$

wherein
X is chlorine or iodine;
$n$ is 1, 2 or 3;
$y$ is 0, 1 or 2; and
$n + y = 3$.

Specifically, the catalysts found most useful in the process are: mono-triphenylphosphine rhodium dicarbonyl chloride (( $[(C_6H_5)_3P]Rh(CO)_2Cl$ )); mono-triphenylphosphine rhodium dicarbonyl iodide (( $[(C_6H_5)_3P]Rh(CO)_2I$ )); bis-triphenylphosphine rodium carbonyl chloride (( $[(C_6H_5)_3P]_2Rh(CO)Cl$ )); bis-triphenylphosphine rhodium carbonyl iodide (( $[(C_6H_5)_3P]_2Rh(CO)I$ )): tris-triphenylphosphine rhodium chloride (( $[(C_6H_5)_3P]_3RhCl$ )); and tris-triphenylphosphine rhodium iodide (( $[(C_6H_5)_3P]_3RhI$ )).

The prior art is repleat with work done by others in the catalyst field which teaches that phosphine-halide complexes of rhodium such as, for example, bis-triphenylphosphine rhodium carbonyl chloride and tris-triphenylphosphine rhodium chloride are not effective catalysts for producing hydroquinone, but rather direct reactions involving olefins and acetylenes to give hydroformylation or hydrogenation products. For example, in the article entitled "The Preparation and Properties of Tris(triphenylphosphine)halogens-rhodium (1) and Some Reactions Thereof Including Catalytic Homogeneous Hydrogenation of Olefins and Acetylenes and Their Derivatives," *Journal of the Chemical Society* (A), pp. 1711-1732, (1966), it is reported that in homogeneous solution the tris(triphenylphosphine) complexes are exceedingly active catalysts for the rapid and homogeneous hydrogenation, at approximately 1 atmosphere of hydrogen pressure and room temperature, of unsaturated compounds containing isolated olefinic and acetylenic linkages. Similar results are reported in *Chemical and Industry*, p. 560, March 27, 1965, which stated that "- - - hex-1-yne in ethanol-benzene solutions of $(Ph_3P)_3RhCl$ was rapidly and quantitatively reduced to n-hexane by hydrogen at less than one atmosphere pressure and 20°C. with catalyst concentrations of ca $5 \times 10^{-3}M$ and hex-1-yne concentrations of ca 2M." It is also reported in *Chemical Communications*, pp. 1244-1245, (1969), and *Journal of the Chemical Society* (A), pp. 3133-3142, (1968), that alkene type compounds undergo rapid hydroformylation even at 25°C. and 1 atmosphere of pressure in the presence of complexes of rhodium such as, for example, $RhH(CO)(PPh_3)_3$. As taught in U. S. Pat. No. 3,446,839 (Col. 4, lines 2-5) the presence of carbon monoxide in a hydroformylation reaction system that employs a rhodium-phosphine complex as a catalyst does not inhibit hydrogenation since the carbon monoxide serves only as an inert diluent. A similar teaching is also found in a number of other patents including U. S. Pat. No. 3,511,880.

Thus, as evidenced by a review of the published work relating to the use of phosphine-halide complexes of rhodium such as, for example, bis-triphenylphosphine rhodium carbonyl chloride and tris-triphenylphosphine rhodium chloride as catalysts in reactions involving unsaturated hydrocarbons, it was generally believed by those working in the field that an acetylene-carbon monoxide-hydrogen reaction system using these catalysts under the reaction conditions tested would not produce hydroquinone in any appreciable quantities, but would yield a hydroformylation product such as propionaldehyde or acrolein. It was, therefore, very surprising to find that these specific catalysts are capable of directing the acetylene-carbon monoxide-hydrogen reactants to give a ring-forming reaction with hydroquinone being the only product produced in high yields.

The process according to this invention may be carried out continuously or batchwise. In batchwise operation it is best to use an autoclave having efficient stirring means. In the continuous embodiment, the liquid phase method may be used. The continuous method is particularly simple when salt hydrates are used which are liquid at the reaction temperature. The gaseous reactants are separated from the reaction product and advantageously returned to the process.

The process is advantageously carried out at temperatures between 100° and 250°C., particularly at from 150° to 200°C. Any suitable pressure of more than 1 atmosphere may be used although it is advantageous for the pressure to be from 500 to 8,000 psi, particularly from 3,000 to 6,000 psi. The pressure is however, not a critical limit and the process may well be carried out at over 8,000 psi although no particular advantage is gained thereby.

The acetylene concentration can range from about 0.1 mole per liter of reactor space to about 3.0 moles per liter with the preferred range being between about 0.6 to 0.7 mole per liter. The ratio of carbon monoxide to hydrogen can vary over a wide range with best results being obtained using a carbon monoxide to hydrogen molar ratio of between about 5:1 to 1:1 and preferably from about 3:1 to 1.5:1. The ratio of carbon monoxide to acetylene can also vary over a relatively wide range with best results being obtained using an carbon monoxide to acetylene molar ratio of between about 1:1 to about 8:1 and preferably from about 4:1 to 6:1.

In certain instances, it may be desirable to use a suitable solvent or diluent to improve the metering of the reactants and for easier control of the reaction. These solvents or diluents must be selected from those which do not enter into the reaction any more than a catalyst might and which do not contaminate or otherwise adversely affect the reactants and/or hydroquinone product. Either hydroxyl-containing solvents or nonhydroxylic-type solvents may be used provided they meet the above requirements. Examples of suitable inert solvents or diluents are ketones, such as acetone, methyl ethyl ketone, diisopropyl ketone and higher homologs; open chain and cyclic ethers, such as dioxane or tetrahydrofuran; hydrocarbons, such as n-hexane, isoheptane, benzene, toluene and cyclohexane; methanol; nitriles, such as acetonitrile and propionitrile; carboxylic amides, such as dimethylformamide or N-methylpyrrolidone; and finally esters and acetals.

The invention will be further illustrated by the following examples and it should be understood that these examples are set forth for purposes of illustration only and are not to be construed as limiting the invention in any manner.

EXAMPLE 1

The following example illustrates a typical synthesis of hydroquinone using the process of this invention.

To a 300 ml. stirred autoclave is charged 140 ml. of methanol, 10 ml. water, 0.4 g. bis-triphenylphosphine rhodium carbonyl chloride (( $[(C_6H_5)_3P]_2Rh(CO)Cl$ )), 4 g. of acetylene, 800 psi of hydrogen and 2,400 psi of carbon monoxide. The autoclave is sealed and the contents therein heated to 170°C. The pressure in the autoclave is then increased to 5,000 psi with CO and maintained at this pressure by intermittently adding additional CO. The reaction is run at these conditions for one hour after which the autoclave is cooled to room temperature and the contents therein are analyzed by conventional methods. Essentially all the solvent is recovered. The autoclave off gas contained 0.08 g. of unreacted acetylena and 0.06 percent carbon, dioxide ($CO_2$) which clearly shows that the hydrogen needed for the reaction did not come from the solvent. A base product of 8.3 g. containing catalyst and hydroquinone is obtained after removing solvent at 80°C. and 1 to 2 mm. pressure. This product analyzed as 66 percent hydroquinone which corresponds to a 67 percent yield and 65 percent conversion of acetylene to hydroquinone. Pure hydroquinone is obtained as white needles (melting point 174.5° – 175.5°C.) by vacuum sublimation and recrystallization.

EXAMPLE 2

This example illustrates that the concentration of acetylene may be doubled with no significant decrease in yield.

The process of Example 1 is repeated except that the acetylene charge is increased to 8 grams and the hydrogen to 1100 psi. The base product after solvent removal contained 74 percent hydroquinone which corresponds to a yield of 64 percent and conversion of 62 percent. Again, substantially all of the solvent is recovered.

EXAMPLE 3

This example illustrates that the catalyst may be generated in situ by adding the proper ratio of components.

To the system described in Example I is charged a molar ratio of 1:1:1 of rhodium to phosphine to iodide by adding to the autoclave 0.2 g. of $Rh_2O_3 \cdot 5H_2O$, 0.3 g. of triphenylphosphine and 0.2 g. of sodium iodide. The process of Example 1 is then repeated except for the different catalyst charge. After solvent removal the base product contained 68 percent hydroquinone which corresponds to a yield of 68 percent and a conversion of 65 percent. Substantially all of the solvent is recovered.

EXAMPLE 4

This example illustrates that water is not essential in the solvent mixture.

The process of Example 3 is repeated except the solvent used is 150 ml. methanol with no added water. After solvent removal the base product contained 64 percent hydroquinone which corresponds to a yield of 67 percent and a conversion of 65 percent. Substantially all of the solvent is again recovered.

EXAMPLE 5

This example illustrates that primarily a non-hydroxyl type solvent may be used.

The process of Example 1 is repeated except that to the autoclave is charged 6 g. of acetylene, 140 ml. acetone, 10 ml. of methanol, 1,500 psi of $H_2$, and 1,500 psi of CO. The catalyst is the same as that used in Example 1, but the reaction time is two hours. A yield of 79 percent and a conversion of 44 percent to hydroquinone is obtained. Essentially all the solvent is recovered.

EXAMPLE 6

This example illustrates that the process will function in a solvent completely free of hydroxyl groups.

The process of Example 5 is repeated except that 13 g. of acetylene is charged and the solvent is 150 ml. of acetone with no added water or methanol. The yield of hydroquinone is 24 percent and the conversion is 23 percent. Substantially all of the solvent is recovered.

EXAMPLE 7

This example illustrates the use of a catalyst containing a ratio of 1:3:1 of rhodium to phosphine to halide.

The process of Example 5 is repeated except that to the autoclave is charged 11 g. of acetylene and 0.5 g. tris-triphenylphosphine rhodium chloride (( $[(C_6H_5)_3P]_3RhCl$ )) as catalyst. The reaction is run 5 hours and the yield to hydroquinone is 45 percent and the conversion is 41 percent. Essentially all the solvent is recovered.

EXAMPLE 8

This example illustrates that the process works at lower temperatures but yields and conversions are decreased.

The process of Example 7 is repeated except that 16 g. of acetylene is charged to the autoclave and the reaction temperature is maintained at 140°C. The yield of hydroquinone is 19 percent and the conversion is 4 percent. Essentially all the solvent is recovered.

EXAMPLE 9

This example illustrates that the process works at higher temperatures.

The process of Example 5 is repeated except the reaction temperature is maintained at 190°C. The yield of hydroquinone is 43 percent and the conversion is 40 percent. Essentially all the solvent is recovered.

EXAMPLE 10

This example illustrates the advantages of having a non-volatile phosphine rhodium-type catalyst as far as catalyst reuse and decontamination of the reaction products are concerned.

Example 3 is again run. Catalyst separation from the hydroquinone product is effected by a vacuum-steam distillation of the reaction mixture. The vacuum-steam distillation is carried out at a base temperature of about 170°–180°C. with a vacuum of 20 mm. An aqueous-methanol solution is taken from the top of the distillation unit while the catalyst residue remains in the base and is reusable for further hydroquinone production. The aqueous-methanol solution is taken to dryness by flash distillation to give 7.2 g. of a light brown solid which analyzes as 83 percent hydroquinone. All of the overhead products from the steam stripper, including the brown solid, contains less than one part-per-million of rhodium.

EXAMPLE 11

This example illustrates the incomplete separation of the rhodium catalyst from hydroquinone when no phosphine is used.

Example 10 is again run except that the catalyst charge is 0.2 g. $Rh_2O_3 \cdot 5H_2O$ and 0.2 g. NaI. The final overhead crude hydroquinone product (4.7 g.) obtained by removal of the water-methanol solvent contains about 10,000 parts-per-million of rhodium.

Thus, it is readily apparent that this process not only eliminates the problems associated with the prior art processes which used reactive hydroxyl-containing compounds as a source of hydrogen but gives yields heretofore unattainable on a commercial scale. In addition, the catalyst is easily separated from the reaction products thereby assuring a minimum of product contamination and a maximum use of the catalyst. The fact that the reaction conditions and amount of reactants charged to the reactor are not narrowly critical is also of utmost importance from a commercial standpoint.

The invention has been described in considerable detail with particular reference to certain preferred embodiments thereof but it will be understood that variations and modifications can be effected within the spirit and scope of the invention.

We claim:

1. A process for the catalytic production of hydroquinone comprising the steps of reacting acetylene, carbon monoxide and hydrogen in an inert solvent at a temperature between about 100° and 250°C. under superatmospheric pressure in the presence of a catalytic amount of a catalyst complex having the formula $$[(C_6H_5)_3P]_n Rh(CO)_y X$$

wherein
X is Cl or I;
$n$ is 1, 2 or 3;
$y$ is 0, 1 or 2; and
$n + y = 3$
and thereafter removing the hydroquinone formed, the molar ratio of carbon monoxide to hydrogen being between about 5:1 to about 1:1 and the molar ratio of carbon monoxide to acetylene being between about 1:1 to about 8:1.

2. The process of claim 1 wherein the temperature is between about 150° and 200°C.

3. The process of claim 1 wherein the pressure is between about 500 to 8,000 psig.

4. The process of claim 3 wherein the pressure is between about 2,000 to 6,000 psig.

5. The process of claim 1 wherein the molar ratio of carbon monoxide to hydrogen is between about 3:1 to 1.5:1.

6. The process of claim 1 wherein the acetylene concentration is from about 0.1 mole/liter to 3.0 moles/liter.

7. The process of claim 1 wherein the acetylene concentration is from about 0.6 mole/liter to 0.7 mole/liter.

8. The process of claim 1 wherein the molar ratio of carbon monoxide to acetylene is between about 4:1 to 6:1.

9. The process of claim 1 wherein the inert solvent is selected from the group consisting of ketones, open chain and cyclic ethers, hydrocarbons, nitriles, carboxylic amides, esters, acetals, alcohols and water.

10. The process of claim 1 wherein the inert solvent is selected from the group consisting of methanol, acetone and water.

11. The process of claim 1 wherein the catalyst is selected from the group consisting of bistriphenylphosphine rhodium carbonyl chloride and tristriphenylphosphine rhodium chloride.

* * * * *